Patented Jan. 10, 1933

1,893,879

UNITED STATES PATENT OFFICE

OWEN G. BENNETT AND JOSEPH C. W. FRAZER, OF BALTIMORE, MARYLAND; SAID BENNETT ASSIGNOR TO CATALYST RESEARCH CORPORATION, OF BALTIMORE, MARYLAND, A CORPORATION OF MARYLAND

METALLIC CATALYST

No Drawing.   Application filed January 28, 1931.   Serial No. 511,925.

This invention relates to metallic catalysts.

The provision of the metallic catalysts known to the prior art has been subject to various disadvantages, both with reference to their modes of preparation, as well as to the catalysts themselves. The methods practised heretofore for the preparation of metallic catalysts have been of an indirect nature. For example, they involve the preparation of a metallic compound with subsequent reduction to metal, as by hydrogen reduction of an oxide, or thermal decomposition of an organic salt. This involves numerous operations, and there is always the danger that the product will be contaminated by metallic oxide or other impurities. Such contamination has an adverse effect upoin catalytic activity, preventing its manifestation, or reducing its efficiency.

Such methods, therefore, are slow and tedious, and they are not adapted to large scale production. Most of them require the use of relatively high temperatures, which may, and frequently does, cause sintering of the particles. This reduces the activity of the catalysts when used at lower temperature. Furthermore, the methods previously used for the production of catalysts are not applicable to all metals, or to the production of mixed catalysts of all metals. Thus, hydrogen reduction methods are not applicable to certain oxides. Therefore, the previously used methods are of restricted applicability, and may give products of low activity.

The objects of this invention are to provide metallic catalysts which are highly active, consist of one or a plurality of metals, as desired, and which may be easily and quickly produced by a method applicable to substantially all metals or mixtures thereof, avoids the use of elevated temperatures, is economical, provides high yields, and through which contamination of the catalysts is avoided.

We have discovered, and it is upon this that our invention is predicated, that highly active metallic catalysts may be prepared in a form presenting a very great active surface by forming an amalgam of metal, and evaporating the mercury from the amalgam under high vacuum and out of contact with agents which reduce the activity of the catalysts.

All of the catalysts provided by this invention consist of particles which individually are very small, and they present a highly extended active surface. In some instances, for example with copper and nickel, the metal is produced in the form of an exceedingly fine powder. In other cases, for example iron and cobalt, the metal remains in more or less coherent aggregates of fine particles. These aggregates are highly porous, and while they may be reduced to powder this will usually be neither necessary or desirable, for they exhibit activity comparable to that of the loose powder forms. Also, many catalysts are used in a compacted, or bonded, form. These aggregates are particularly desirable for such use, being a natural result of the process. The powder forms may be compacted, as referred to hereinafter. Whether the metal remains as an impalpable powder, or whether in the agglomerated forms refered to, a very great surface of high activity is presented. All such forms are referred to as "particulate".

Distillation of the mercury is effected at low temperatures so that sintering of the particles is avoided. Also, the distillation is effected in the absence of metal-reactive gases, that is, gases such as air or other oxygen-containing gases, which may reach with or be adsorbed by the metal to reduce its surface activity. This provides a surface of free metal, whose activity evidences properties resembling those of nascent gases. The freedom of the surfaces from oxide and the like is shown in various ways. For example, copper produced by our process is much brighter than that produced by hydrogen reduction of copper oxide. In this manner catalysts of maximum purity and activity are provided.

The absence of activity-reducing materials, and the great activity of our catalysts, manifests itself in various ways. Thus, prior to contact with air the materials produced in accordance with our invention are wet by mercury immediately upon coming into contact with it. As a general rule finely divided particles, such as those produced by reduction methods, would resist such wetting and amalgamate slowly. A further indication of their activity is given by the readiness with which our catalytic metals form carbonyls by treatment with carbon monoxide. Nickel carbonyl may be formed in this manner at room temperature, and iron at about 100 to 120° C., under atmospheric pressure in both cases. It is to be observed in this connection that for this purpose the iron may be used in the form of the agglomerates referred to above, which is further evidence of the great activity of such aggregates.

These catalysts also undergo pyrophoric oxidation when exposed to oxygen-containing gases, which is further evidence of their extremely fine divsion and activity. The extent of this oxidation varies with the material, copper and nickel being oxidized less violently than iron and cobalt. Our catalysts also exhibit unusually high adsorptive power. Thus, nickel prepared by distillation of mercury from an amalgam thereof takes up five or six times more hydrogen than nickel prepared by reduction methods. This is indicative of the catalytic value of our catalysts, since it shows particularly great hydrogenation power.

The finely divided catalytic metals provided by our invention also may be bonded autogenously by the application of pressure alone. This is indicative also of the characteristics of our particulate products, for example the freedom from oxide films, and the surface activity.

The amalgams may be prepared by direct physical contact of the metal with mercury. For example, silver, gold, tin, cadmium, copper, zinc, and some other metals amalgamate merely by physical contact of the metal with clean mercury. In order to expedite amalgamation such metals are preferably used in the form of small pieces, turnings, powder or similar divided form. Enough mercury is used to produce complete amalgamation. Gentle heat may be used if desired, to accelerate the alloying.

However, the preferred procedure is to electrolytically deposit metal at a mercury surface, as by electrolysis of a solution of a salt of the metal in question, using a mercury cathode. In this case the metal is deposited at the mercury surface and immediately amalgamates with it. When an amalgam of the desired strength has been thus prepared it may be withdrawn from the cell and treated to evaporate the mercury. This procedure is applicable to the metals just referred to, as well as to those which do not readily amalgamate by contact, such as iron, nickel, cobalt, chromium, platinum and manganese.

In such electrolytic amalgam formation the invention is not limited to practice in any one manner, as various alternative procedures known in the art may be followed, both as to the electrolyte and as to the type of anode used. For example, an insoluble anode may be used, or the anode may comprise the metal which is to be comminuted. In such cases the electrolyte comprises either a solution of a salt of the anode metal, or a solution of a suitable electrolyte, dilute sulfuric acid, for example.

Where it is desired to produce catalysts comprising a plurality of metals, it is preferred to mix separately prepared amalgams of the individual metals. These are, in general, fully miscible. For example, catalysts consisting of copper and zinc have been made by distillation of a mixed amalgam made by adding an amalgam of copper to an amalgam of zinc. Likewise, amalgams prepared by the electrolytic methods referred to above may be mixed with one another, or with those prepared by direct contact. Such mixed amalgams may also be made directly by concurrent or successive amalgamation either by the contact or the electrolytic methods described.

No particular concentrations are necessary, although rather viscous amalgams are desirable, as they increase the yields. In the deposition procedures the current voltage relations need be controlled only to effect deposition.

After the amalgam has been prepared, it is transferred to a suitable apparatus and the mercury is evaporated under high vacuum. The highest practicable degree of evacuation affords the most satisfactory results, as it makes possible distillation at lower temperatures than when using lesser degrees of evacuation. When the mercury has been completely evaporated from the amalgam, the original metal remains in the highly active extended surface form described hereinabove. In general, when in this condition the material does not resemble the metal as it appears in mass.

The amalgams are protected so fas as practicable, from metal-reactive gases, especially those containing oxygen, and especially during distillation, when the "nascent" condition of the metal, and the elevated temperature, increase the tendency toward oxidation. In some instances it may be desirable to continue this protection until the catalyst is in its working environment, to retain it at its highest efficiency. Thus nickel for hydrogenation may be sealed in the tube in which distillation took place, or it may be suspended in an inert oil prior to contact with air. In general, however, this will be unnecessary.

This application is a continuation of our copending application Ser. No. 461,843, filed June 17, 1930.

According to the provisions of the patent statutes, we have explained the principle and mode of operation of our invention, and have described what we now consider to represent its best embodiment. However, we desire to have it understood that, within the scope of the appended claims, the invention may be practiced otherwise than as specifically described.

We claim:

1. A process of preparing highly active metallic catalysts comprising preparing an amalgam of catalytic metal with mercury, and evaporating the mercury from said amalgam under high vacuum and out of contact with metal-reactive gases, the metal remaining in a form which presents a very great highly active free metal surface.

2. A process of preparing highly active catalysts composed of a plurality of catalytic metals comprising forming an amalgam of said metals, and distilling the mercury from said amalgam under high vacuum and out of contact with metal-reactive gases, the metal remaining in an intimate homogeneous finely divided form which presents a very great highly active surface.

3. A process of preparing highly active catalysts composed of a plurality of catalytic metals comprising amalgamating the individual metals with mercury, mixing the resultant amalgams of said metals, and distilling the mercury from said mixed amalgam under high vacuum and out of contact with metal-reactive gases, the metals remaining in an intimate homogeneous finely divided form which presents a very great highly active free metal surface.

4. A method of preparing a highly active metallic catalyst comprising forming an amalgam of a catalytic metal of the iron group with mercury, and distilling the mercury from said amalgam under high vacuum and out of contact with oxidizing gases, said metal remaining in a form which presents a greatly extended highly active surface, is capable of being autogeneously bonded without destroying its activity, and undergoes pyrophoric oxidation upon exposure to oxidizing gases.

5. A method of preparing catalytically active nickel comprising forming an amalgam of nickel with mercury, and distilling the mercury from said amalgam under high vacuum and out of contact with oxidizing gases, the nickel remaining as a fine powder of high activity, said activity including high adsorptive power, ability to form nickel carbonyl at atmospheric temperature, and including pyrophoric oxidation upon exposure to an oxygen-containing gas.

6. A process of preparing highly active metallic catalysts comprising electrolytically depositing catalytic metal at a mercury surface to form an amalgam thereof, and distilling the mercury from said amalgam under high vacuum and out of contact with metal-reactive gases, the metal remaining in a finely particulate form which presents a highly active surface.

7. A metallic catalyst produced by distillation of mercury from an amalgam of mercury with catalytic metal under high vacuum and out of contact with metal-reactive gases, and being in a form presenting an extended highly active free metal surface.

8. Catalytic nickel produced by distillation of mercury from a nickel amalgam under high vacuum and out of contact with air and being finely divided, of high hydrogen adsorptive power, and capable of pyrophoric oxidation upon exposure to oxygen.

In testimony whereof, we hereunto sign our names.

OWEN G. BENNETT.
JOSEPH C. W. FRAZER.